(No Model.)  2 Sheets—Sheet 1.
S. V. HUBER.
MECHANISM FOR PILING BARS.
No. 580,601. Patented Apr. 13, 1897.
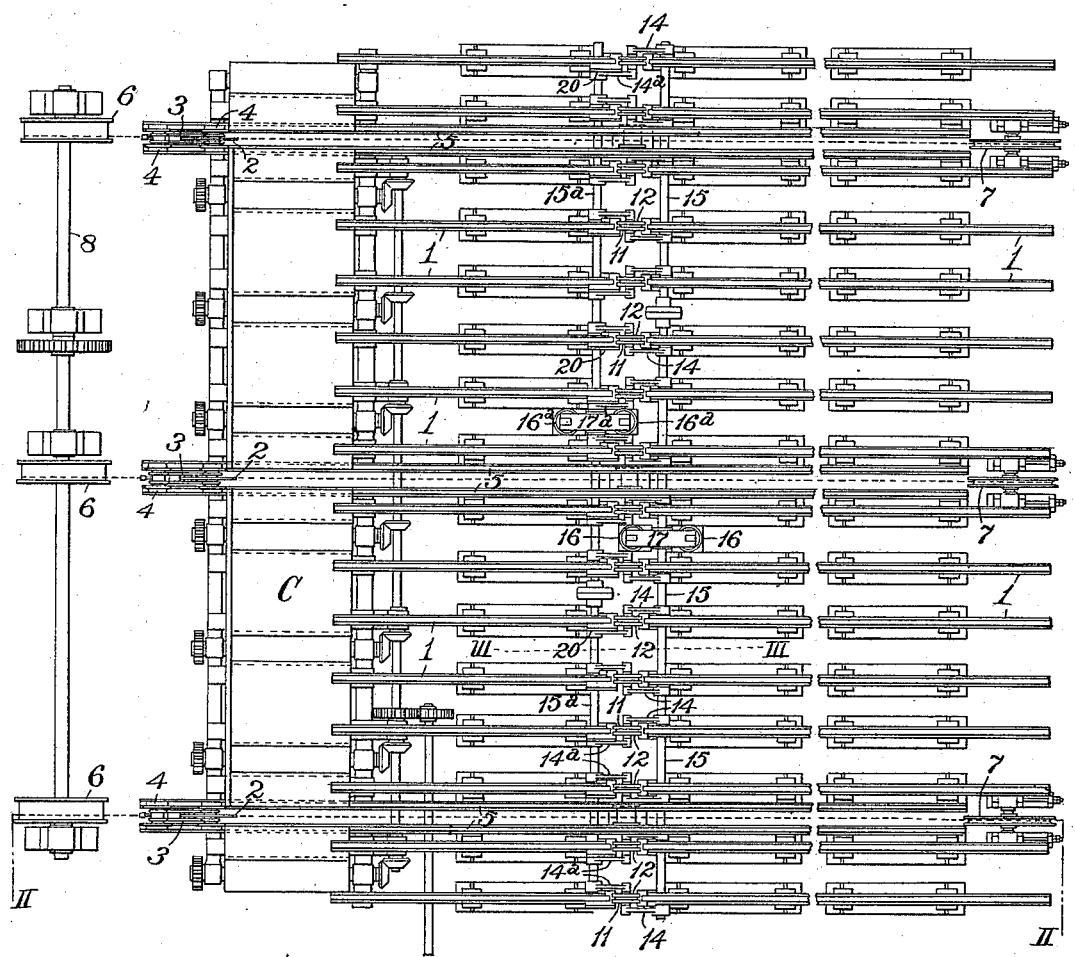
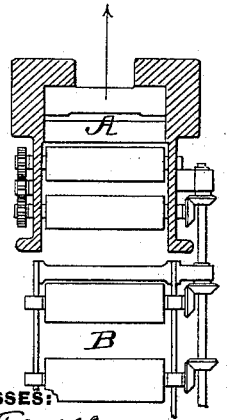
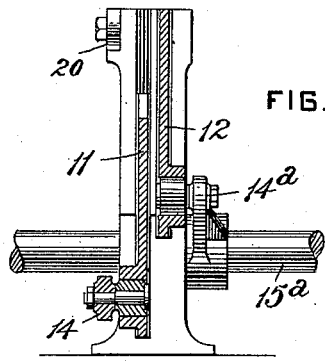
WITNESSES:
Chas. F. Miller.
J. E. Gaither.
INVENTOR.
Sigmund V. Huber
by Darwin C. Wolcott
Att'y.

(No Model.) 2 Sheets—Sheet 2.
S. V. HUBER.
MECHANISM FOR PILING BARS.
No. 580,601. Patented Apr. 13, 1897.
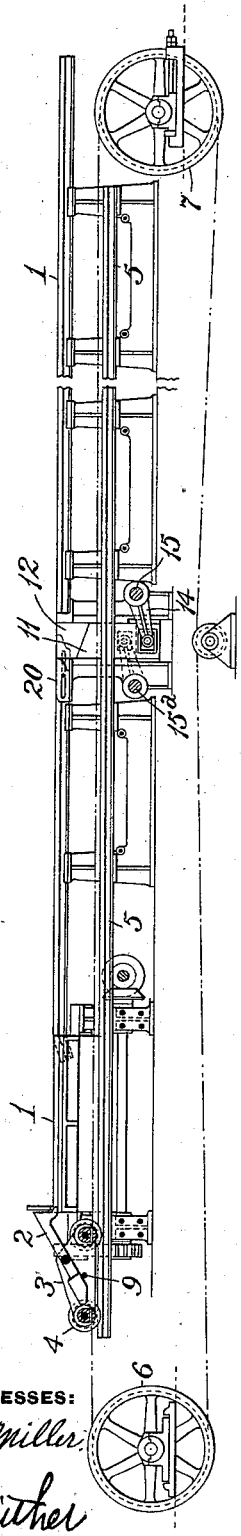
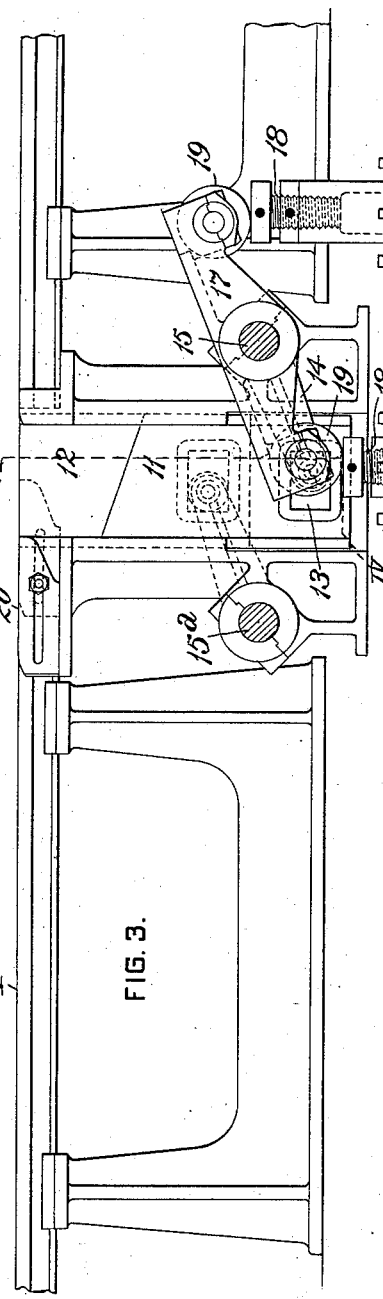
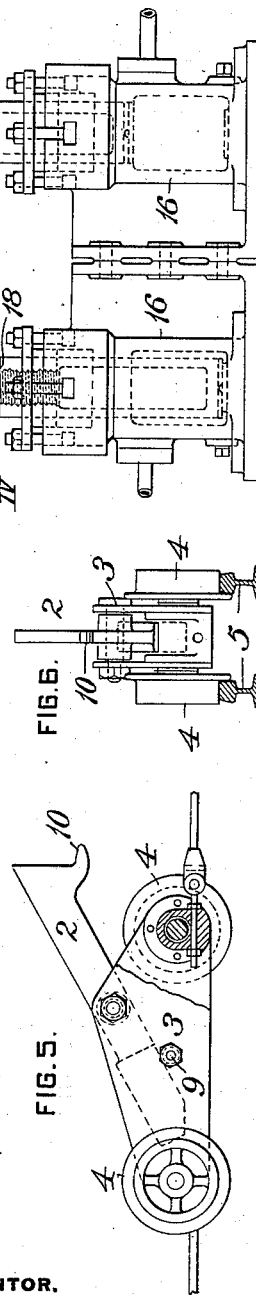
WITNESSES:
Chas. F. Miller
A. E. Gaither
INVENTOR.
Sigmund V. Huber
by Darwin S. Wolcott
Att'y.

UNITED STATES PATENT OFFICE.

SIGMUND V. HUBER, OF YOUNGSTOWN, OHIO.

MECHANISM FOR PILING BARS.

SPECIFICATION forming part of Letters Patent No. 580,601, dated April 13, 1897.

Application filed December 28, 1896. Serial No. 617,177. (No model.)

*To all whom it may concern:*

Be it known that I, SIGMUND V. HUBER, a citizen of the United States, residing at Youngstown, in the county of Mahoning and State of Ohio, have invented or discovered certain new and useful Improvements in Mechanism for Piling Bars, &c., of which improvement the following is a specification.

The invention described herein relates to certain improvements in mechanism for shearing, piling, and transferring bars along a bed or table usually known in the art as a "hotbed," and has for its object a construction whereby bars, &c., may be quickly and accurately arranged in piles, regardless of any twisting or bending of the bars subsequent to rolling.

The invention is hereinafter more fully described and claimed.

In the accompanying drawings, forming a part of this specification, Figure 1 is a top plan view of my improved mechanism, showing its relation to the feed-table of the rolling-mill and the shear mechanism. Fig. 2 is a sectional elevation, the plane of section being indicated by the line II II, Fig. 1. Fig. 3 is a sectional elevation, on an enlarged scale, the plane of section being indicated by the line III III, Fig. 1. Fig. 4 is a transverse section, the plane of section being indicated by the line IV IV, Fig. 3. Figs. 5 and 6 are side and end elevations, respectively, of the mechanism for shifting the bars singly or in piles along the hotbed.

In the practice of my invention the shearing mechanism A, which may be of any suitable construction, is arranged in line with the feed-table B of the rolling-mill. On the opposite side of the shear mechanism is arranged the table C, provided with positively-driven rollers and adapted to receive the bars, &c., as they come from the shearing mechanism. A series of rails 1 are arranged on one side of the table C at right angles to the line of movement of articles thereon. These rails are supported on suitable standards at such a height that their upper surfaces will be approximately tangential to the rollers of the table C, so that the bars, &c., can be easily slid laterally off the rollers onto and along the rails.

The transfer of the bars, &c., is effected by means of dogs 2, pivotally mounted on buggies 3, which have wheels 4, arranged to travel along pairs of rails 5. These rails 5, which form portions of the hotbed, extend across the feed-table C, parallel or approximately parallel with the rollers of said table, as shown in Fig. 1. Any suitable means may be employed for moving the buggies along the rails, such, for example, as that shown, consisting of endless ropes connected to the buggies and passing over pulleys 6 and 7, arranged in line with the pairs of rails 5 and a short distance beyond their ends. One set of pulleys, as 6, is secured to a shaft 8, which is adapted to be rotated in opposite directions as it is desired to move the buggies. The rear ends of the dogs are provided with weights, so that they will normally rest upon stops 9, which are so located that fingers 10 on the front ends of the dogs will be slightly below the surfaces of the rails and will therefore pass under the edges of bars, &c., resting on the rollers or rails.

After being sheared the bars, &c., are moved longitudinally in front of the dogs 2, and by the movement of the latter are shifted laterally onto and along the rails 1 into an opening or gap formed in the hotbed and preferably at right angles to the direction of movement of the bars, as shown in Figs. 2 and 3. Two sets of vertical slides 11 and 12 are arranged in suitable guides within this gap or opening, as shown in Figs. 1, 2, 3, and 4. The slides 11 of one set are provided with transverse slots 13, having blocks movably arranged therein. These blocks are attached to arms 14, secured to a shaft 15, which is mounted in suitable bearings parallel with the sides of the gap or opening in the hotbed. This shaft is rotated to raise and lower the slides 11 by fluid-pressure cylinders 16, having pistons adapted to bear against the arms 17, secured to the shaft 15. In order to provide for the adjustment of the movement of the slides, the upper ends of the piston-rods are formed by threaded stems 18, screwing into the rods. To lessen friction, the arms 17 are provided with rollers 19, which rest upon the heads of the stems 18. The slides 12 are similarly operated by cylinders 16ª by means of a similarly-constructed system of shaft and arms.

The upper ends of the slides 11 are inclined so that bars dropping thereon will slide down against the rear wall of the gap or opening, while the upper ends of the slides 12 are straight or parallel with the upper surface of the rails 1.

When it is desired to arrange the bars in piles, the slides 12 are lowered and the slides 11 are raised until their upper corner is a little below the surfaces of the rails 1, so that a bar moved along the rails will drop into the gap or opening with an axial movement and slide along its inclined upper end against the rear wall of the opening. Before the next bar reaches the opening the slide is lowered a distance approximately equal to the thickness of the bars, so that the next bar will drop into position onto the preceding bar. This operation is continued, the slides being lowered after each bar drops into position or as often as necessary to insure the dropping of the bars to the desired position. After the desired number of bars has been piled in the manner stated the slides 12 are raised. As these slides lift the pile of bars the latter will be shifted from their transversely-inclined positions, as the upper edges of the slides 12 are straight. By the continued upward movement of the slides 12 the pile of bars is raised until the under side of the lowest bar is on a level with or slightly above the upper surfaces of the rails 1. From this position the pile of bars can be shifted along the hotbed by the dogs 2.

The piling gap or opening in the bed is made of a width a little greater than that of the widest bar to be piled, and in order to be adapted to the mechanism for piling narrower bars arms 20 are adjustably secured alongside of the rails 1, as shown in Figs. 2, 3, and 4. By shifting these arms out or in the width of the gap can be changed to correspond with the width of the bars to be piled.

When it is desired to shift the bars singly along the rails 1 to the rear end of the bed, the slides 12 are raised to the position shown in Fig. 2, so that their upper ends form a continuation of the rails 1, or the arms 20 can be made of sufficient length to form a bridge across the transverse opening. It will be readily understood by those skilled in the art that the shearing mechanism may be omitted, the table C being in such case a continuation of the table B.

I claim herein as my invention—

1. The combination of a bed or supporting-rails having a gap or opening transverse of the line of movement of bars, &c., along the bed, a vertically-movable slide arranged in said gap or opening and means for moving the bars, &c., along the bed, substantially as set forth.

2. The combination of a bed or supporting-rails having a gap or opening transverse of the line of movement of bars, &c., along said bed or rails, a vertically-movable slide having an inclined upper or receiving end arranged in said gap or opening, and means for moving the bars, &c., along the bed, substantially as set forth.

3. The combination of a bed or supporting-rails having a gap or opening transverse of the line of movement of bars, &c., along the bed, two vertically-movable slides arranged in said gap or opening, one of said slides having an inclined upper or receiving end, while the corresponding end of the other slide is straight or approximately parallel with the upper surface of the bed or supporting-rails, and means for moving the bars, &c., along the bed, substantially as set forth.

4. The combination of a bed or supporting-rails having a gap or opening transverse of the line of movement of bars, &c., along the bed, movable arms adapted to project over the gap or opening, a vertically-movable slide arranged in the gap or opening, and means for shifting the bars, &c., substantially as set forth.

In testimony whereof I have hereunto set my hand.

SIGMUND V. HUBER.

Witnesses:
  DARWIN S. WOLCOTT,
  F. E. GAITHER.